United States Patent
Rand et al.

(10) Patent No.: US 10,969,871 B2
(45) Date of Patent: *Apr. 6, 2021

(54) HAPTIC OUTPUT SYSTEMS

(71) Applicant: Cirrus Logic International Semiconductor Ltd., Edinburgh (GB)

(72) Inventors: Robert David Rand, Peebles (GB); Tony Stephen Doy, Los Gatos, CA (US); Thomas Ivan Harvey, Northcote (AU)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/810,512

(22) Filed: Mar. 5, 2020

(65) Prior Publication Data
US 2020/0201441 A1    Jun. 25, 2020

Related U.S. Application Data

(63) Continuation of application No. 15/875,512, filed on Jan. 19, 2018, now Pat. No. 10,620,704.

(51) Int. Cl.
*G06F 3/01* (2006.01)
*G06F 3/16* (2006.01)
(Continued)

(52) U.S. Cl.
CPC .............. *G06F 3/016* (2013.01); *G06F 3/167* (2013.01); *G06F 3/0416* (2013.01); *G06F 3/0488* (2013.01)

(58) Field of Classification Search
CPC ........ G06F 3/016; G06F 3/167; G06F 3/0416; G06F 3/0488
(Continued)

(56) References Cited

U.S. PATENT DOCUMENTS 4,902,136 A    2/1990  Mueller et al.
5,684,722 A   11/1997  Thorner et al.
(Continued)

FOREIGN PATENT DOCUMENTS

AU    2002347829        4/2003
CN    103165328 A       6/2013
(Continued)

OTHER PUBLICATIONS

International Search Report and Written Opinion of the International Searching Authority, International Application No. PCT/GB2019/052991, dated Mar. 17, 2020, received by Applicant Mar. 19, 2020.
(Continued)

*Primary Examiner* — Emily C Terrell
(74) *Attorney, Agent, or Firm* — Jackson Walker L.L.P.

(57) ABSTRACT

The present disclosure relates to a system for providing substantially synchronised haptic and audio outputs. The system includes a signal processor which is configured to receive an audio signal from a main processor of the system and to receive a haptic signal, which may be received from the main processor, or may be retrieved from memory, or else may be generated in real-time by the signal processor. The signal processor calculates a delay to be applied to the haptic signal or the audio signal and outputs a delayed version of the audio signal and the haptic signal, or a delayed version of the haptic signal and the audio signal, to appropriate output stages.

16 Claims, 5 Drawing Sheets

(51) Int. Cl.
*G06F 3/041* (2006.01)
*G06F 3/0488* (2013.01)

(58) Field of Classification Search
USPC .................................................. 340/407.1
See application file for complete search history.

(56) References Cited

U.S. PATENT DOCUMENTS

| | | | |
|---|---|---|---|
| 5,748,578 | A | 5/1998 | Schell |
| 5,857,986 | A | 1/1999 | Moriyasu |
| 6,050,393 | A | 4/2000 | Murai et al. |
| 6,278,790 | B1 | 8/2001 | Davis et al. |
| 6,332,029 | B1 | 12/2001 | Azima et al. |
| 6,388,520 | B2 | 5/2002 | Wada et al. |
| 6,580,796 | B1 | 6/2003 | Kuroki |
| 6,683,437 | B2 | 1/2004 | Tierling |
| 6,703,550 | B2 | 3/2004 | Chu |
| 6,762,745 | B1 | 7/2004 | Braun et al. |
| 6,906,697 | B2 | 6/2005 | Rosenberg |
| 6,995,747 | B2 | 2/2006 | Casebolt et al. |
| 7,154,470 | B2 | 12/2006 | Tierling |
| 7,623,114 | B2 | 11/2009 | Rank |
| 7,639,232 | B2 | 12/2009 | Grant et al. |
| 7,791,588 | B2 | 9/2010 | Tierling et al. |
| 7,979,146 | B2 | 7/2011 | Ullrich et al. |
| 8,068,025 | B2 | 11/2011 | Devenyi et al. |
| 8,098,234 | B2 | 1/2012 | Lacroix et al. |
| 8,102,364 | B2 | 1/2012 | Tierling |
| 8,325,144 | B1 | 12/2012 | Tierling et al. |
| 8,427,286 | B2 | 4/2013 | Grant et al. |
| 8,441,444 | B2 | 5/2013 | Moore et al. |
| 8,466,778 | B2 | 6/2013 | Hwang et al. |
| 8,480,240 | B2 | 7/2013 | Kashiyama |
| 8,572,293 | B2 | 10/2013 | Cruz-Hernandez et al. |
| 8,572,296 | B2 | 10/2013 | Cruz-Hernandez et al. |
| 8,593,269 | B2 | 11/2013 | Grant et al. |
| 8,648,829 | B2 | 2/2014 | Shahoian et al. |
| 8,659,208 | B1 | 2/2014 | Rose et al. |
| 8,754,757 | B1 | 6/2014 | Ullrich et al. |
| 8,947,216 | B2 | 2/2015 | Da Costa et al. |
| 8,981,915 | B2 | 3/2015 | Birnbaum et al. |
| 8,994,518 | B2 | 3/2015 | Gregorio et al. |
| 9,030,428 | B2 | 5/2015 | Fleming |
| 9,063,570 | B2 | 6/2015 | Weddle et al. |
| 9,083,821 | B2 | 7/2015 | Hughes |
| 9,092,059 | B2 | 7/2015 | Bhatia |
| 9,117,347 | B2 | 8/2015 | Matthews |
| 9,128,523 | B2 | 9/2015 | Buuck et al. |
| 9,164,587 | B2 | 10/2015 | Da Costa et al. |
| 9,196,135 | B2 | 11/2015 | Shah et al. |
| 9,248,840 | B2 | 2/2016 | Truong |
| 9,326,066 | B2 | 4/2016 | Klippel |
| 9,329,721 | B1 | 5/2016 | Buuck et al. |
| 9,354,704 | B2 | 5/2016 | Lacroix et al. |
| 9,368,005 | B2 | 6/2016 | Cruz-Hernandez et al. |
| 9,489,047 | B2 | 11/2016 | Jiang et al. |
| 9,507,423 | B2 | 11/2016 | Gandhi et al. |
| 9,513,709 | B2 | 12/2016 | Gregorio et al. |
| 9,520,036 | B1 | 12/2016 | Buuck |
| 9,588,586 | B2 | 3/2017 | Rihn |
| 9,640,047 | B2 | 5/2017 | Choi et al. |
| 9,652,041 | B2 | 5/2017 | Jiang et al. |
| 9,697,450 | B1 | 7/2017 | Lee |
| 9,740,381 | B1 | 8/2017 | Chaudhri et al. |
| 9,842,476 | B2 | 12/2017 | Rihn et al. |
| 9,864,567 | B2 | 1/2018 | Seo |
| 9,881,467 | B2 | 1/2018 | Levesque |
| 9,946,348 | B2 | 4/2018 | Ullrich et al. |
| 9,947,186 | B2 | 4/2018 | Macours |
| 9,959,744 | B2 | 5/2018 | Koskan et al. |
| 9,965,092 | B2 | 5/2018 | Smith |
| 10,032,550 | B1 | 7/2018 | Zhang et al. |
| 10,055,950 | B2 | 8/2018 | Saboune et al. |
| 10,074,246 | B2 | 9/2018 | Da Costa et al. |
| 10,110,152 | B1 | 10/2018 | Hajati |
| 10,171,008 | B2 | 1/2019 | Nishitani et al. |
| 10,175,763 | B2 | 1/2019 | Shah |
| 10,264,348 | B1 | 4/2019 | Harris et al. |
| 10,447,217 | B2 | 10/2019 | Zhao et al. |
| 10,564,727 | B2 | 2/2020 | Billington et al. |
| 10,620,704 | B2 | 4/2020 | Rand et al. |
| 10,667,051 | B2 | 5/2020 | Stahl |
| 10,732,714 | B2 | 8/2020 | Rao et al. |
| 10,782,785 | B2 | 9/2020 | Hu et al. |
| 2002/0018578 | A1 | 2/2002 | Burton |
| 2003/0068053 | A1 | 4/2003 | Chu |
| 2003/0214485 | A1 | 11/2003 | Roberts |
| 2006/0028095 | A1 | 2/2006 | Maruyama et al. |
| 2006/0284856 | A1 | 12/2006 | Soss |
| 2008/0240458 | A1* | 10/2008 | Goldstein ............ H04R 1/1083 381/72 |
| 2008/0293453 | A1 | 11/2008 | Atlas et al. |
| 2008/0316181 | A1 | 12/2008 | Nurmi |
| 2009/0079690 | A1 | 3/2009 | Watson et al. |
| 2009/0088220 | A1 | 4/2009 | Persson |
| 2009/0102805 | A1 | 4/2009 | Meijer et al. |
| 2009/0153499 | A1 | 6/2009 | Kim et al. |
| 2010/0013761 | A1 | 1/2010 | Birnbaum et al. |
| 2010/0141408 | A1 | 6/2010 | Doy et al. |
| 2011/0056763 | A1 | 3/2011 | Tanase et al. |
| 2011/0141052 | A1 | 6/2011 | Bernstein et al. |
| 2011/0163985 | A1 | 7/2011 | Bae et al. |
| 2011/0167391 | A1 | 7/2011 | Momeyer et al. |
| 2012/0105358 | A1 | 5/2012 | Momeyer et al. |
| 2012/0206246 | A1 | 8/2012 | Cruz-Hernandez et al. |
| 2012/0206247 | A1 | 8/2012 | Bhatia et al. |
| 2012/0229264 | A1 | 9/2012 | Company Bosch et al. |
| 2012/0306631 | A1 | 12/2012 | Hughes |
| 2013/0027359 | A1 | 1/2013 | Schevin et al. |
| 2013/0141382 | A1 | 6/2013 | Simmons et al. |
| 2013/0275058 | A1 | 10/2013 | Awad |
| 2013/0289994 | A1 | 10/2013 | Newman et al. |
| 2014/0056461 | A1 | 2/2014 | Afshar |
| 2014/0064516 | A1 | 3/2014 | Cruz-Hernandez et al. |
| 2014/0079248 | A1 | 3/2014 | Short et al. |
| 2014/0118125 | A1 | 5/2014 | Bhatia |
| 2014/0119244 | A1 | 5/2014 | Steer et al. |
| 2014/0139327 | A1 | 5/2014 | Bau et al. |
| 2014/0226068 | A1* | 8/2014 | Lacroix .................. G06F 15/16 348/515 |
| 2014/0292501 | A1 | 10/2014 | Lim et al. |
| 2014/0340209 | A1 | 11/2014 | Lacroix et al. |
| 2015/0061846 | A1* | 3/2015 | Yliaho ............... H04N 21/8547 340/407.1 |
| 2015/0070260 | A1 | 3/2015 | Saboune et al. |
| 2015/0084752 | A1 | 3/2015 | Heubel et al. |
| 2015/0216762 | A1 | 8/2015 | Oohashi et al. |
| 2015/0324116 | A1 | 11/2015 | Marsden et al. |
| 2015/0325116 | A1 | 11/2015 | Umminger, III |
| 2015/0341714 | A1 | 11/2015 | Ahn et al. |
| 2016/0063826 | A1 | 3/2016 | Morrell et al. |
| 2016/0074278 | A1 | 3/2016 | Muench et al. |
| 2016/0132118 | A1 | 5/2016 | Park et al. |
| 2016/0141606 | A1 | 5/2016 | Ahn et al. |
| 2016/0162031 | A1 | 6/2016 | Westerman et al. |
| 2016/0179203 | A1 | 6/2016 | Modarres et al. |
| 2016/0239089 | A1 | 8/2016 | Taninaka et al. |
| 2016/0246378 | A1 | 8/2016 | Sampanes et al. |
| 2016/0358605 | A1 | 12/2016 | Ganong, III et al. |
| 2017/0052593 | A1 | 2/2017 | Jiang et al. |
| 2017/0078804 | A1 | 3/2017 | Guo et al. |
| 2017/0083096 | A1 | 3/2017 | Rihn et al. |
| 2017/0090572 | A1 | 3/2017 | Holenarsipur et al. |
| 2017/0153760 | A1 | 6/2017 | Chawda et al. |
| 2017/0168574 | A1 | 6/2017 | Zhang |
| 2017/0220197 | A1 | 8/2017 | Matsumoto et al. |
| 2017/0277350 | A1 | 9/2017 | Wang et al. |
| 2017/0357440 | A1 | 12/2017 | Tse |
| 2018/0059733 | A1 | 3/2018 | Gault et al. |
| 2018/0059793 | A1 | 3/2018 | Hajati |
| 2018/0067557 | A1 | 3/2018 | Robert et al. |
| 2018/0074637 | A1 | 3/2018 | Rosenberg et al. |
| 2018/0082673 | A1 | 3/2018 | Tzanetos |
| 2018/0084362 | A1 | 3/2018 | Zhang et al. |

(56) References Cited

U.S. PATENT DOCUMENTS

| | | |
|---|---|---|
| 2018/0151036 A1 | 5/2018 | Cha et al. |
| 2018/0158289 A1 | 6/2018 | Vasilev et al. |
| 2018/0160227 A1 | 6/2018 | Lawrence et al. |
| 2018/0178114 A1 | 6/2018 | Mizuta et al. |
| 2018/0182212 A1 | 6/2018 | Li et al. |
| 2018/0183372 A1 | 6/2018 | Li et al. |
| 2018/0237033 A1 | 8/2018 | Hakeem et al. |
| 2018/0253123 A1 | 9/2018 | Levesque et al. |
| 2018/0321748 A1 | 11/2018 | Rao et al. |
| 2018/0329172 A1 | 11/2018 | Tabuchi |
| 2018/0335848 A1 | 11/2018 | Moussette et al. |
| 2018/0367897 A1 | 12/2018 | Bjork et al. |
| 2019/0227628 A1 | 1/2019 | Rand et al. |
| 2019/0064925 A1 | 2/2019 | Kim et al. |
| 2019/0073078 A1 | 3/2019 | Sheng et al. |
| 2019/0103829 A1 | 4/2019 | Vasudevan et al. |
| 2019/0138098 A1 | 5/2019 | Shah |
| 2019/0163234 A1 | 5/2019 | Kim et al. |
| 2019/0215349 A1 | 7/2019 | Adams et al. |
| 2019/0114496 A1 | 8/2019 | Lesso |
| 2019/0294247 A1 | 9/2019 | Hu et al. |
| 2019/0296674 A1 | 9/2019 | Janko et al. |
| 2019/0297418 A1 | 9/2019 | Stahl |
| 2019/0311590 A1 | 10/2019 | Doy et al. |
| 2019/0341903 A1 | 11/2019 | Kim |
| 2020/0218352 A1* | 7/2020 | Macours .................. H04R 3/04 |

FOREIGN PATENT DOCUMENTS

| | | |
|---|---|---|
| EP | 0784844 B1 | 6/2005 |
| EP | 2363785 A1 | 9/2011 |
| EP | 2600225 A1 | 6/2013 |
| EP | 2846218 A1 | 3/2015 |
| EP | 2846329 A1 | 3/2015 |
| EP | 3125508 A1 | 2/2017 |
| EP | 3379382 A1 | 9/2018 |
| IN | 201747044027 | 8/2018 |
| JP | H02130433 B2 | 5/1990 |
| JP | 08149006 A | 6/1996 |
| JP | 6026751 B2 | 11/2016 |
| JP | 6250985 | 12/2017 |
| JP | 6321351 | 5/2018 |
| KR | 20120126446 A | 11/2012 |
| WO | 2013104919 A1 | 7/2013 |
| WO | 2013186845 A1 | 12/2013 |
| WO | 2014018086 A1 | 1/2014 |
| WO | 2014094283 A1 | 6/2014 |
| WO | 2016105496 A1 | 6/2016 |
| WO | 2016164193 A1 | 10/2016 |
| WO | 2017113651 A1 | 7/2017 |
| WO | 2018053159 A1 | 3/2018 |
| WO | 2018067613 A1 | 4/2018 |
| WO | 2018125347 A1 | 7/2018 |

OTHER PUBLICATIONS

International Search Report and Written Opinion of the International Searching Authority, International Application No. PCT/US2020/023342, dated Jun. 9, 2020.

International Search Report and Written Opinion of the International Searching Authority, International Application No. PCT/GB2020/050823, dated Jun. 30, 2020.

Communication Relating to the Results of the Partial International Search, and Provisional Opinion Accompanying the Partial Search Result, of the International Searching Authority, International Application No. PCT/GB2020/050822, dated Jul. 9, 2020.

International Search Report and Written Opinion of the International Searching Authority, International Application No. PCT/GB2020/051037, dated Jul. 9, 2020.

International Search Report and Written Opinion of the International Searching Authority, International Application No. PCT/GB2020/051035, dated Jul. 10, 2020.

International Search Report and Written Opinion of the International Searching Authority, International Application No. PCT/US2020/024864, dated Jul. 6, 2020.

International Search Report and Written Opinion of the International Searching Authority, International Application No. PCT/GB2020/050822, dated Aug. 31, 2020.

International Search Report and Written Opinion of the International Searching Authority, International Application No. PCT/GB2020/051438, dated Sep. 28, 2020.

International Search Report and Written Opinion of the International Searching Authority, International Application No. PCT/GB2019/050964, dated Sep. 3, 2019.

International Search Report and Written Opinion of the International Searching Authority, International Application No. PCT/GB2019/050770, dated Jul. 5, 2019.

Communication Relating to the Results of the Partial International Search, and Provisional Opinion Accompanying the Partial Search Result, of the International Searching Authority, International Application No. PCT/US2018/031329, dated Jul. 20, 2018.

Combined Search and Examination Report, UKIPO, Application No. GB1720424.9, dated Jun. 5, 2018.

First Examination Opinion Notice, State Intellectual Property Office of the People's Republic of China, Application No. 201880037435.X, dated Dec. 31, 2020.

International Search Report and Written Opinion of the International Searching Authority, International Application No. PCT/US2020/056610, dated Jan. 21, 2021.

* cited by examiner

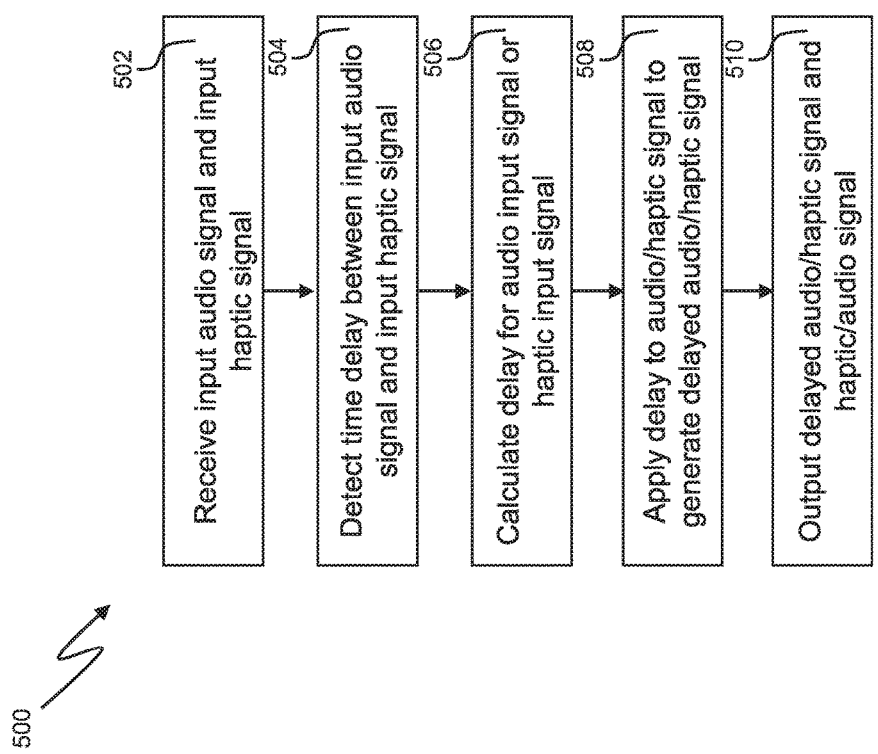

HAPTIC OUTPUT SYSTEMS

This application is a continuation of U.S. patent application Ser. No. 15/875512, filed Jan. 19, 2018, which is incorporated by reference herein in its entirety.

FIELD OF THE INVENTION

The present disclosure relates to the field of haptic output systems. In particular, the present disclosure relates to a system and method for providing a haptic output that is substantially synchronised with an audio output.

BACKGROUND

Modern computing devices such as smartphones, tablet computers, smart watches and the like are increasingly being provided with haptic output systems in addition to conventional video and audio output systems such as screens and speakers. Such haptic output systems provide outputs that can be felt by a user of the device, and these haptic outputs may be used, for example, to simulate the feeling of a mechanical button being depressed or clicked.

Additionally, virtual reality (VR) and augmented reality (AR) devices may employ haptic output systems as well as video and audio output systems, to produce a multi-sensory user experience that may be more immersive and realistic, and therefore richer, than in systems which provide only audio and visual outputs.

Applications such as games that run on devices that include haptic output systems have to be designed and programmed specifically to take advantage of the haptic capabilities of the device. This means that additional programming time and resource must be devoted to developing mechanisms for providing appropriate haptic outputs during use of the application by a user.

SUMMARY

According to a first aspect, the invention provides a system for providing audio and haptic outputs, the system comprising: an audio output amplifier for driving an audio output transducer; a haptic output amplifier for driving a haptic output transducer; and a signal processor, wherein the signal processor is configured to: receive an audio signal representing audio to be output by the audio output transducer; receive a haptic signal representing a haptic output to be output by the haptic output transducer; apply a delay to the received audio signal to generate a delayed audio signal or apply a delay to the received haptic signal to generate a delayed haptic signal; output the delayed audio signal to the audio amplifier and output the haptic signal to the haptic output amplifier, or output the delayed haptic signal to the haptic output amplifier and output the audio signal to the audio output amplifier, such that an audio output signal output by the audio output amplifier is substantially synchronised with a haptic output signal output by the haptic output amplifier.

The system of the first aspect provides a mechanism for providing substantially synchronised audio and haptic outputs. This mechanism can be used to provide improved multi-sensory output information to a user of an application executing on the system.

The signal processor may be configured to: detect a characteristic of the received audio signal that indicates that a particular audio effect is represented by the received audio signal; upon detecting the characteristic of the received audio signal, generate a haptic signal which corresponds to the particular audio effect; apply a delay to the received audio signal to generate a delayed audio signal; output the delayed audio signal to the audio amplifier and output the haptic signal to the haptic output amplifier, such that an audio output signal representing the particular audio effect output by the audio output amplifier is substantially synchronised with a haptic output signal corresponding to the particular audio effect output by the haptic output amplifier.

Thus, the signal processor is able dynamically to analyse the received audio signal to identify a particular audio effect to be output by the audio output transducer and provide a corresponding haptic signal to drive the haptic output transducer to generate a corresponding haptic output. In this way, applications that were not designed to provide haptic outputs can be enriched by providing additional sensory information to the user.

The signal processor may configured to detect a characteristic comprising an envelope of the received audio signal, which envelope corresponds to an envelope of the particular audio effect.

The signal processor may be configured to analyse one or more characteristics of the envelope of the received audio signal, wherein the one or more characteristics comprise: signal strength; attack time; decay time; speed of attack; and speed of decay.

Additionally or alternatively, the signal processor may be configured to detect a characteristic comprising a frequency signature present in the received audio signal, which frequency signature corresponds to a frequency signature of the particular audio effect.

Generating the haptic output signal may comprise retrieving a haptic playback waveform corresponding to the particular sound from a memory containing a plurality of haptic playback waveforms.

The signal processor may be further configured to: receive a signal from the audio output amplifier; receive a signal from the haptic output amplifier; compare the received signals to estimate a time delay between output of an audio output drive signal by the audio output amplifier and output of a haptic output drive signal by the haptic output amplifier; and adjust the delay applied to the received audio signal or the delay applied to the received haptic signal to compensate for the time delay so estimated.

The signal processor may be further configured to: monitor a voltage or current level at the audio output amplifier or haptic output amplifier; based on the monitored voltage or current levels, estimate a time delay between the output of the audio signal by the audio output transducer and output of the haptic signal by the haptic output transducer; and adjust the delay applied to the received audio signal or the delay applied to the received haptic signal to compensate for the time delay so estimated.

The signal processor may be configured to: estimate a time delay between the received audio signal and the received haptic signal based on the difference between a time at which the audio signal was received by the signal processor and a time at which the haptic signal was received by the signal processor; and apply a delay based on the estimated time delay to the received audio signal to generate the delayed audio signal or apply a delay based on the estimated time delay to the received haptic signal to generate the delayed haptic signal.

The signal processor may be configured to: analyse the received audio signal to identify the presence of a particular audio effect in the received audio signal; analyse the received haptic signal to identify the presence of a particular haptic effect in the received haptic signal; estimate a time delay between the received audio signal and the received haptic signal based on the difference between a time at which the identified audio effect was detected in the received audio signal and a time at which the identified haptic effect was detected in the received haptic signal; and apply a delay based on the estimated time delay to the received audio signal to generate the delayed audio signal or apply a delay based on the estimated time delay to the received haptic signal to generate the delayed haptic signal.

A further aspect of the invention provides a method for providing a haptic output and an audio output at a device, the method comprising: receiving an audio signal representing audio to be output by the device; receiving a haptic signal representing a haptic output to be output by the device; applying a delay to the received audio signal to generate a delayed audio signal or applying a delay to the received haptic signal to generate a delayed haptic signal; and outputting the delayed audio signal and outputting the haptic signal, or outputting the delayed haptic signal and outputting the audio signal, such that an audio signal representing a particular audio effect output by the device is substantially synchronised with a haptic signal corresponding to the particular audio effect output by the device.

The method may further comprise: detecting a characteristic of the received audio signal that indicates that a particular audio effect is represented by the received audio signal; upon detecting the characteristic of the received audio signal, generating a haptic signal which corresponds to the particular audio effect; applying a delay to the received audio signal to generate a delayed audio signal; outputting the delayed audio signal and outputting the haptic signal, such that an audio output signal representing the particular audio effect output by the device is substantially synchronised with a haptic output signal corresponding to the particular audio effect output by the device.

The method may further comprise detecting a characteristic comprising an envelope of the received audio signal, which envelope corresponds to an envelope of the particular audio effect.

The method may further comprise analysing one or more characteristics of the envelope of the received audio signal, wherein the one or more characteristics comprise: signal strength; attack time; decay time; speed of attack; and speed of decay.

Additionally, or alternatively, the method may comprise detecting a characteristic comprising a frequency signature present in the received audio signal, which frequency signature corresponds to a frequency signature of the particular audio effect.

Generating the haptic output signal may comprise retrieving a haptic playback waveform corresponding to the particular sound from a memory containing a plurality of haptic playback waveforms.

The method may further comprise: receiving a signal from an audio output amplifier; receiving a signal from a haptic output amplifier; comparing the received signals to estimate a time delay between output of an audio output drive signal by the audio output amplifier and output of a haptic output drive signal by the haptic output amplifier; and adjusting the delay applied to the received audio signal or the delay applied to the received haptic signal to compensate for the time delay so estimated.

The method may further comprise: monitoring a voltage or current level at an audio output amplifier or a haptic output amplifier; based on the monitored voltage or current levels, estimating a time delay between the output of the audio signal by the audio output transducer and output of the haptic signal by the haptic output transducer; and adjusting the delay applied to the received audio signal or the delay applied to the received haptic signal to compensate for the time delay so estimated.

The method may further comprise: estimating a time delay between the received audio signal and the received haptic signal based on the difference between a time at which the audio signal was received by the signal processor and a time at which the haptic signal was received by the signal processor; and applying a delay based on the estimated time delay to the received audio signal to generate the delayed audio signal or applying a delay based on the estimated time delay to the received haptic signal to generate the delayed haptic signal.

The method may further comprise analysing the received audio signal to identify the presence of a particular audio effect in the received audio signal; analysing the received haptic signal to identify the presence of a particular haptic effect in the received haptic signal; estimating a time delay between the received audio signal and the received haptic signal based on the difference between a time at which the identified audio effect was detected in the received audio signal and a time at which the identified haptic effect was detected in the received haptic signal; and applying a delay based on the estimated time delay to the received audio signal to generate the delayed audio signal or applying a delay based on the estimated time delay to the received haptic signal to generate the delayed haptic signal.

A further aspect of the invention provides a signal processor configured to: receive an audio signal representing audio to be output by a device; receive a haptic signal representing a haptic output to be output by the device; apply a delay to the received audio signal to generate a delayed audio signal or apply a delay to the received haptic signal to generate a delayed haptic signal; apply a delay to the received audio signal to generate a delayed audio signal or apply a delay to the received haptic signal to generate a delayed haptic signal; output the delayed audio signal and output the haptic signal, or output the delayed haptic signal and output the audio signal, such that an audio output signal representing a particular audio effect output by the device is substantially synchronised with a haptic output signal corresponding to the particular audio effect output by the device.

The signal processor may be configured to: detect a characteristic of the received audio signal that indicates that a particular audio effect is represented by the received audio signal; upon detecting the characteristic of the received audio signal, generate a haptic signal which corresponds to the particular audio effect; apply a delay to the received audio signal to generate a delayed audio signal; output the delayed audio signal and output the haptic signal, such that an audio output signal representing the particular audio effect output the device is substantially synchronised with a haptic output signal corresponding to the particular audio effect output by the device.

The signal processor may be configured to detect a characteristic comprising an envelope of the received audio signal, which envelope corresponds to an envelope of the particular audio effect.

The signal processor may be configured to analyse one or more characteristics of the envelope of the received audio signal, wherein the one or more characteristics comprise: signal strength; attack time; decay time; speed of attack; and speed of decay.

Additionally or alternatively, the signal processor may be configured to detect a characteristic comprising a frequency signature present in the received audio signal, which frequency signature corresponds to a frequency signature of the particular audio effect.

Generating the haptic output signal may comprise retrieving a haptic playback waveform corresponding to the particular sound from a memory containing a plurality of haptic playback waveforms.

The signal processor may be further configured to: receive a signal from an audio output amplifier of the device; receive a signal from a haptic output amplifier of the device; compare the received signals to estimate a time delay between output of an audio output drive signal by the audio output amplifier and output of a haptic output drive signal by the haptic output amplifier; and adjust the delay applied to the received audio signal or the delay applied to the received haptic signal to compensate for the time delay so estimated.

The signal processor may be further configured to: monitor a voltage or current level at an audio output amplifier or a haptic output amplifier of the device; based on the monitored voltage or current levels, estimate a time delay between the output of the audio signal by an audio output transducer of the device and output of the haptic signal by a haptic output transducer of the device; and adjust the delay applied to the received audio signal or the delay applied to the received haptic signal to compensate for the time delay so estimated.

The signal processor may be configured to: estimate a time delay between the received audio signal and the received haptic signal based on the difference between a time at which the audio signal was received by the signal processor and a time at which the haptic signal was received by the signal processor; and apply a delay based on the estimated time delay to the received audio signal to generate the delayed audio signal or apply a delay based on the estimated time delay to the received haptic signal to generate the delayed haptic signal.

The signal processor may be configured to: analyse the received audio signal to identify the presence of a particular audio effect in the received audio signal; analyse the received haptic signal to identify the presence of a particular haptic effect in the received haptic signal; estimate a time delay between the received audio signal and the received haptic signal based on the difference between a time at which the identified audio effect was detected in the received audio signal and a time at which the identified haptic effect was detected in the received haptic signal; and apply a delay based on the estimated time delay to the received audio signal to generate the delayed audio signal or apply a delay based on the estimated time delay to the received haptic signal to generate the delayed haptic signal.

BRIEF DESCRIPTION OF THE DRAWINGS

Embodiments of the invention will now be described, strictly by way of example only, with reference to the accompanying drawings, of which:

FIG. 5 is a flow chart illustrating steps performed by a signal processor to output substantially synchronised audio and haptic output signals in the system of FIG. 4.

DETAILED DESCRIPTION

Figure 1:
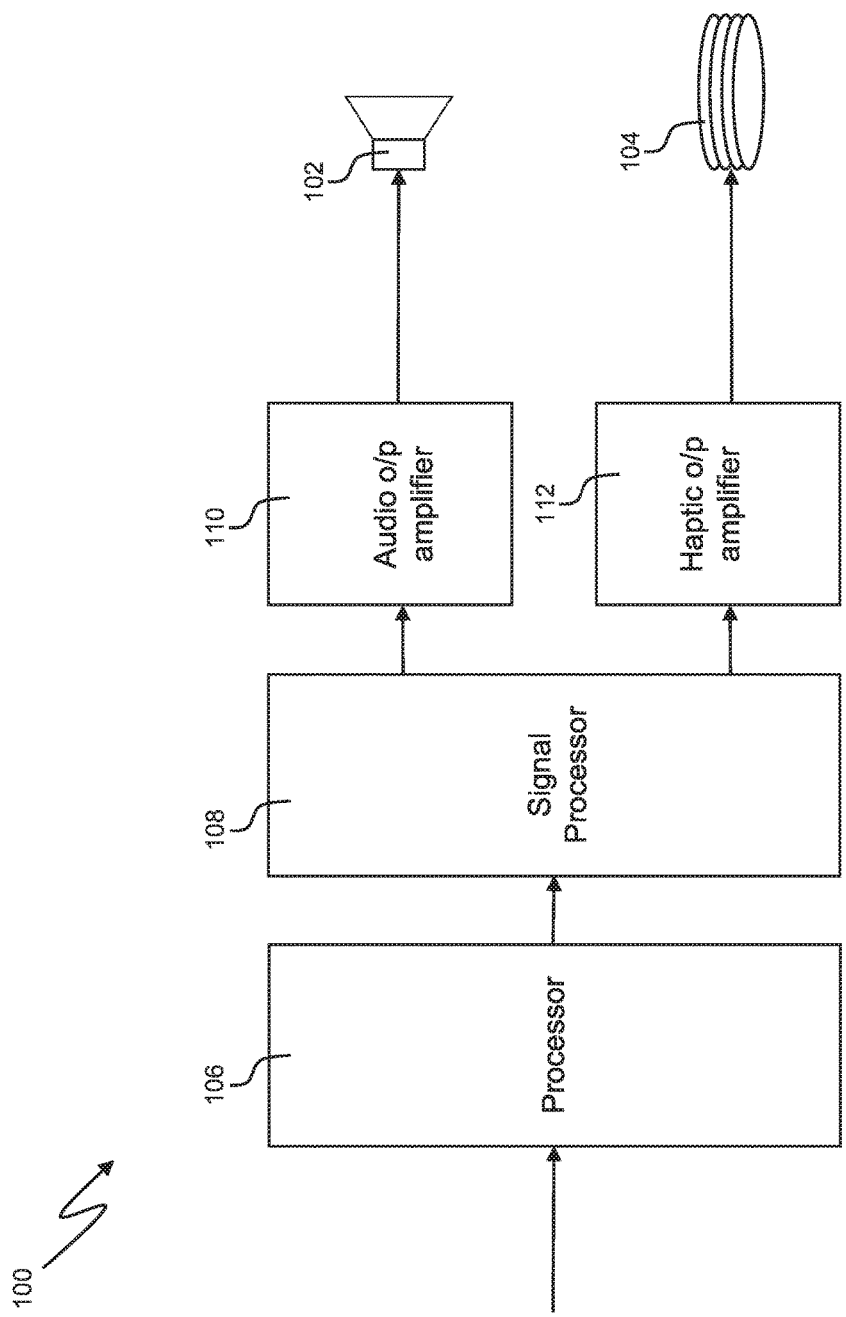
FIG. 1 is a schematic diagram showing part of a device having audio and haptic output transducers.

FIG. 1 is a schematic diagram showing part of a device 100 having audio and haptic output transducers 102, 104. The device 100 may be a mobile telephone, tablet or laptop computer, smart watch, virtual reality (VR) or augmented reality (AR) device, for example. For the sake of clarity elements of the device 100 which are not relevant to the present disclosure are not shown in FIG. 1, but those skilled in the art will appreciate that the device 100 may include further elements and components in addition to those shown in FIG. 1.

The device 100 includes a processor 106, which may be, for example, an application processor. The processor 106 interfaces with a signal processor 108, which may be, for example, a digital signal processor (DSP). The signal processor 108 interfaces with an audio output amplifier 110, which is configured to output an audio output drive signal to drive the audio output transducer 102. The signal processor 108 also interfaces with a haptic output amplifier 112, which is configured to output a haptic output drive signal to drive the haptic output transducer 104.

The processor 106 runs an operating environment of the device 100 to allow software applications such as games to be executed by the device 100. Such an application typically receives user inputs. The user inputs may include one or more of: touch and/or gestural user inputs that can be detected by a touch-sensitive surface (e.g. a touch screen) of the device (not shown); kinetic user inputs such as rotating or tilting the device that can be detected by a sensor such as an accelerometer or gyroscope of the device (also not shown); and audio user inputs such as spoken commands that can be detected by a sensor such as a microphone of the device (also not shown). In response to detection of a user input the application is operative to generate appropriate outputs at the device. For example, the application may be operative to cause images displayed on a display of the device (not shown) to be updated, and to cause appropriate audio effects to be output by the audio output transducer 102. The application may also be operative to cause appropriate haptic outputs to be provided by the haptic output transducer 104 in response to detection of user inputs.

For example, in a driving game application, the user may interact with a touch screen of the device 100, e.g. by touching a graphical representation of an accelerator pedal or a brake pedal presented on a touch screen of the device in order to accelerate or brake a vehicle within the game. Such touches are detected by the touch screen and result in the images displayed on the display of the device being updated by the application to give a visual indication that the vehicle is accelerating or braking. The updates to the images displayed on the display may be accompanied by appropriate audio effects being output by the output audio transducer 102, such as an engine revving effect when the accelerator pedal is touched, or a tyre screech effect when the brake pedal is touched.

In order to steer the vehicle the user may rotate the device in a clockwise direction to turn left or an anticlockwise direction to turn right. In response to detection of such kinetic inputs by the accelerometer and/or gyroscope of the device, the images displayed on the display are updated as appropriate by the application to give a visual indication of the movement of the vehicle. In addition, appropriate audio effects such as a tyre screech effect may be output by the output audio transducer 102.

Audio user input such as voice commands may additionally be used, for example to perform special functions such as firing a weapon. On detection of a valid voice command or other audio user input, the images displayed on the display may be updated as appropriate to give a visual indication of the effect of the command, and appropriate audio effects such as a gunshot effect may be output by the output audio transducer 102.

The application may also be configured to make use of the haptic output transducer 104 to provide additional sensory information to the user. In the driving game application example discussed above, in addition to updating the images displayed on the display and outputting appropriate audio effects, the device 100 may also provide haptic outputs in response to the user inputs. For example, the haptic output transducer 104 may be actuated to cause the device 100 to vibrate at the same time as the images displayed on the display are updated and the audio effect is output by the output audio transducer 102, thereby providing additional sensory information to the user.

In such applications the haptic output must be designed in to the application at the outset. In other words, the designer of the application must identify the user inputs, visual outputs and audio outputs that are to be associated with haptic outputs, and manually program the application to provide the haptic outputs in response to the identified user inputs or in combination with the identified visual or audio outputs. As will be appreciated, this is a time consuming process at the programming stage.

An alternative approach to providing haptic outputs, in which an audio stream generated by an application is analysed in real-time during execution of the application in order to provide haptic outputs corresponding to particular output audio effects, will now be described with reference to FIGS. 2 and 3.

Figure 2:
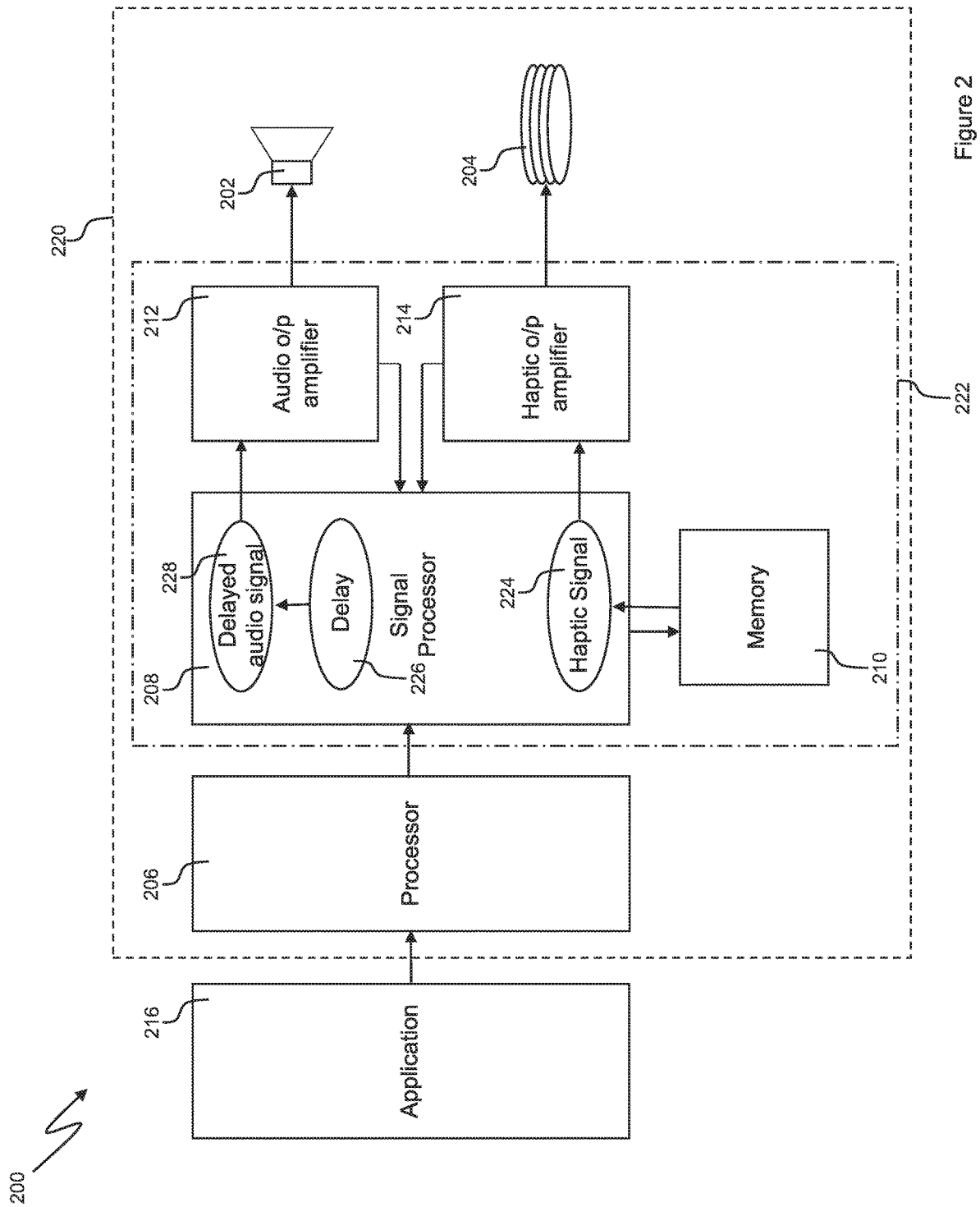
FIG. 2 is a schematic diagram showing part of a system for providing substantially synchronised audio and haptic outputs.

FIG. 2 is a schematic diagram showing part of a system for providing substantially synchronised audio and haptic outputs.

The system, shown generally at 200 in FIG. 2, includes an audio output transducer 202 for providing an audio output and a haptic output transducer 204 for providing a haptic output.

The system 200 further includes a processor 206, which may be, for example, an application processor. The processor 206 interfaces with a signal processor 208, which may be, for example, a digital signal processor (DSP). The signal processor 208 interfaces with a memory 210. The memory 210 stores a plurality of haptic output signals, each of which corresponds to a different one of a plurality of particular audio effects.

The plurality of haptic output signals stored in the memory 210 may be generated in a number of different ways. For example, an audio signature or envelope for each member of a set of audio effects could be derived and then mapped to or associated with an appropriate corresponding haptic output signal or waveform, with the each pair of audio effect signature or envelope and its corresponding haptic output signal or waveform then being stored in the memory 210. As will be appreciated, manually generating a large library of audio effect signatures or waveforms and their corresponding haptic output signals or waveforms is a time- and resource-intensive task. To reduce the time overhead of populating the memory 210 with the audio effect signatures or envelopes and their corresponding haptic output signals or waveforms, a machine learning system such as a neural network could be trained using a relatively small set of known audio effect signatures or envelopes and their corresponding haptic output signals or waveforms to generate appropriate haptic output signals or waveforms for new audio effect signatures or envelopes, and the memory 210 could be populated with the results.

The signal processor 208 also interfaces with an audio output amplifier 212, which is configured to output an audio output drive signal to drive the audio output transducer 202. Additionally, the signal processor 208 interfaces and with a haptic output amplifier 214, which is configured to output a haptic output drive signal to drive the haptic output transducer 204.

The audio output transducer 202, haptic output transducer 204, processor 206, signal processor 208, memory 210, audio output amplifier 212 and haptic output amplifier 214 may be parts of a device (represented in FIG. 2 by the dashed box 220) such as a mobile telephone, tablet or laptop computer, smart watch, VR or AR device or the like on which a software application 216 such as a game can be executed. Further, the signal processor 208, memory 210, audio output amplifier 212 and haptic output amplifier 214 may be packaged on a single integrated circuit, as indicated by the chain dashed box 222 in FIG. 2.

The processor 206 runs an operating environment of the system 200 to allow the software application 216 to be executed by the system 200. During execution, the software application 216 causes audio effects to be output by the audio output transducer 202. For example, in the case of the driving game application referred to above, audio effects such as an engine revving effect, a tyre screech effect and a gunshot effect may be output by the audio output transducer during execution.

In order to output such audio effects, the application 216 generates an audio stream, which is a signal representing audio to be output by the output audio transducer 202. The audio to be output may comprise a stream of audio effects of the kind discussed above, or may comprise additional audio, such as a background musical track in addition to the audio effects.

The audio stream is output by the processor 206 to an input of the signal processor 208. The signal processor 208 processes this received input audio stream to generate appropriate audio output signals. The audio output signals are output by the signal processor 208 to the audio output amplifier 212, which in turn outputs an audio output drive signal to drive the audio output transducer 202, thereby causing the required audio to be output by the audio output transducer 202.

In order to provide additional sensory output to the user, the system 200 is configured to analyse the audio stream generated by the application 216 in order to identify particular audio effects for which a corresponding haptic output is available. When such a particular audio effect is identified, an associated haptic output signal is generated to cause the corresponding haptic output to be provided by the haptic output transducer 204.

To this end, in addition to processing the input audio stream to generate appropriate audio output signals, the signal processor 208 is also configured to analyse the input audio stream to identify particular audio effects for which a corresponding haptic output is available, to generate an appropriate haptic output signal and to output the haptic output signal to the haptic output amplifier 214.

Figure 3:
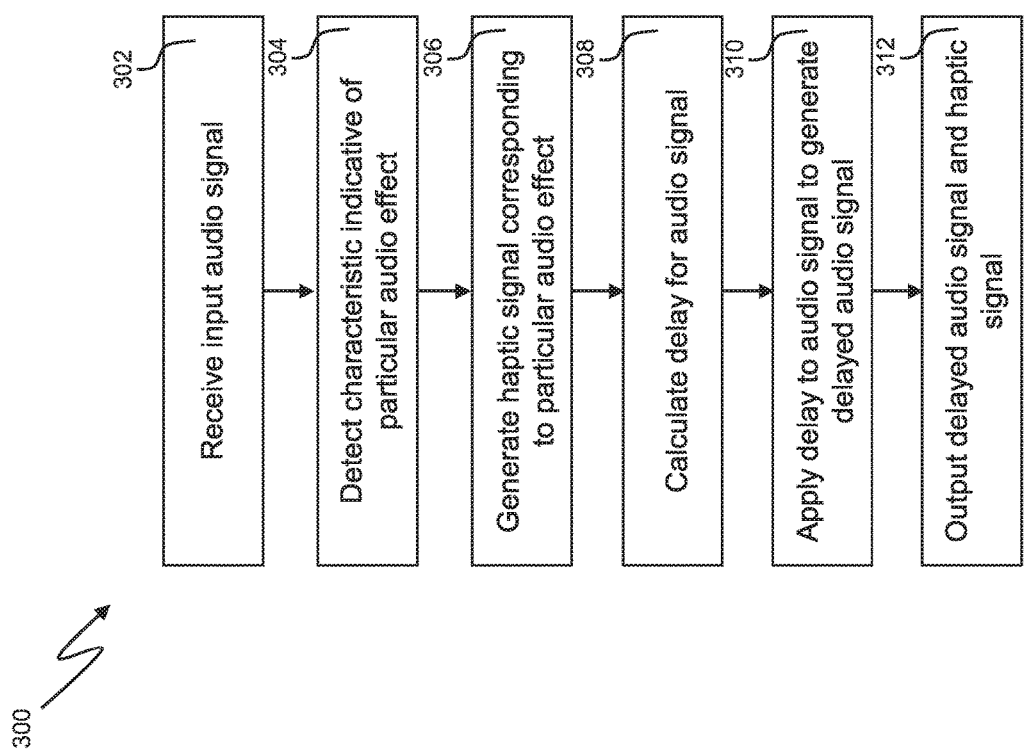
FIG. 3 is a flow chart illustrating steps performed by a signal processor to output substantially synchronised audio and haptic output signals corresponding to a particular audio effect in the system of FIG. 2.

FIG. 3 is a flow diagram illustrating steps performed by the signal processor 208 to generate a haptic output signal to be input to the haptic output amplifier 214 and to generate an audio output signal to be input to the audio output amplifier 212.

In step 302, the signal processor 208 receives, from the processor 206, the audio stream, which is an input audio signal representing the audio that is to be output by the audio output transducer 202.

In step 304, the signal processor 208 analyses the received audio stream to detect a characteristic of the received audio stream that is indicative that a particular audio effect is present in the received audio stream.

The signal processor 208 may be configured to detect one or more of a number of different characteristics. For example, the signal processor 208 may be configured to analyse an envelope of part or all of the audio stream. For different audio effects the envelope of the audio stream (or the relevant part of the audio stream) will be different, so by comparing the envelope of the audio stream to known envelopes corresponding to particular audio effects the signal processor 208 is able to detect the presence of a particular audio effect in the audio stream.

Alternatively or additionally, one or more characteristics of the envelope of the audio stream, such as signal strength, attack time, rate of attack, decay time, or rate of decay may be detected or measured by the signal processor 208 and used to detect the presence of a particular audio effect in the audio stream.

Alternatively or additionally, the signal processor 208 may be configured to analyse a frequency signature of part or all of the audio stream. For different audio effects the frequency signature of the audio stream (or the relevant part of the audio stream) will be different, so by comparing the frequency signature of the audio stream to known frequency signatures corresponding to particular audio effects the signal processor 208 is able to detect the presence of a particular audio effect in the audio stream.

In an alternative (or additional) approach, the signal processor 208 may be configured to use an impulse sound algorithm to identify audio effects that are present in the audio stream. For an impulse audio effect (e.g. a gunshot or a door slamming), the impulse may be classified based on the audio information contained in the impulse. For example, a significant amount of characteristic information can be found in the trailing impulse of the sound. By analysing the impulse the signal processor 208 can identify the presence of particular audio effects in the audio stream.

Once the presence of a particular audio effect has been detected in the input audio stream using one or more of the techniques discussed above, the signal processor 208 generates (at step 306) a haptic output signal, e.g. a haptic playback waveform, corresponding to the detected audio effect. The generated haptic output signal is received by the signal processor 208 (e.g. in an output buffer), for outputting to the haptic output amplifier 214.

To generate the haptic output signal (which is shown at 224 in FIG. 2) the signal processor 208 may retrieve a haptic output signal that corresponds to the particular audio effect that has been detected from the memory 210.

As an alternative to retrieving a haptic output signal that corresponds to the particular audio effect that has been detected from the memory 210, the signal processor 208 may be configured to generate a suitable haptic output signal in real-time using an algorithm that detects characteristics of part or all of the audio stream and, based on these detected characteristics, constructs a corresponding haptic output signal. For example, the algorithm may detect the envelope of all of part of the audio stream and/or particular characteristics of the envelope such as signal strength, attack time, rate of attack, decay time, or rate of decay and use the envelope or the detected characteristics to construct a corresponding haptic output signal.

Alternatively or additionally, the algorithm may analyse a frequency signature of part or all of the audio stream to detect the presence of a particular audio effect in the audio stream, and, based on the results of this analysis, generate a haptic output signal corresponding to the detected audio effect.

As a further alternative, an impulse sound algorithm of the kind described above may be used to analyse part or all of the audio stream to detect the presence of a particular audio effect in the audio stream and an appropriate haptic output signal can be generated algorithmically based on this analysis.

As will be appreciated, analysing the audio stream to detect the presence of a particular audio effect and generating the haptic output signal takes time, and thus there will be a time delay between the time at which the detected audio effect appears in the audio stream and the time at which the haptic output signal 224 corresponding to the detected audio effect is available for output by the signal processor 208 to the haptic output amplifier 214. This delay may be in the region of 50-100 ms. Delay may be also introduced into the audio stream due to the software that runs on the processor 206 and transmission of the audio stream from the processor 206 to the signal processor 208, but these delays are relatively small (in the region of 10-30 ms and 1-3 ms respectively) relative to the delay involved in analysing the audio stream and generating a haptic output signal. Thus it will be appreciated that if the audio stream and the haptic output signal 224 were simply output by the signal processor 208 as soon as they were available there would be an undesirable latency between the particular audio effect being output by the audio output transducer 202 and the corresponding haptic output being output by the haptic output transducer 204.

In order to minimise or at least reduce this latency, at step 308 the signal processor 208 calculates a delay 226 to be applied to the audio signal to compensate for the delay introduced in generating the haptic output signal 224.

At step 310, the delay 226 is applied to the input audio stream to generate a delayed version 228 of the input audio stream, and this delayed audio stream is then output (step 312) by the signal processor 208 to the audio output amplifier 212. The audio output amplifier 212 outputs an audio output drive signal to drive the audio output transducer 202. At the same time, the haptic signal output 224 is output by the signal processor 208 to the haptic output amplifier 214, which outputs a haptic output drive signal to drive the haptic output transducer 204. In this way the outputs of the audio output amplifier 212 and the haptic output amplifier 214 are substantially synchronised, and the signals output by the audio output transducer 202 and the haptic output transducer 204 are also substantially synchronised, such that there is substantially no time delay between the user of the system 200 hearing the audio effect (e.g. a gunshot) output by the audio output transducer 202 and feeling a haptic output of the system 200 (e.g. a vibration).

Feedback signals from the audio output amplifier 212 and the haptic output amplifier 214 can be input to the signal processor 208 to improve further the synchronisation between the audio signal output by the audio output transducer 202 and the haptic output transducer 204 or to compensate for degradation in synchronisation performance. Such degradation in synchronisation performance may arise, for example, from delays introduced downstream of the signal processor 208 by systems such as a speaker protection system or a haptics protection system, or factors such as drift in the audio output amplifier 212, haptic output amplifier 214, audio output transducer 202 or haptic output transducer 204, or temperature-based variations in the performance of the audio output amplifier 212, haptic output amplifier 214, audio output transducer 202 or haptic output transducer 204.

For example, a speaker protection system that is operative to prevent damage to the audio output transducer 202 resulting from over-excursion may introduce a variable delay of 4-6 ms, whilst a haptics protection system that is operative to prevent damage to the haptic output transducer 204 resulting from over-excursion may introduce a similar variable delay of 4-6 ms. As will be appreciated, if the delay introduced by the speaker protection system differs from the delay introduced by the haptics protection system, then a loss of synchronisation between the outputs of the audio output transducer 202 and the haptic output transducer 204 will result.

In one simple example, the audio output amplifier 212 is configured to provide a signal to the signal processor 208 when the audio output amplifier 212 outputs the audio output drive signal to the audio output transducer 202. Similarly, the haptic output amplifier 214 is configured to provide a signal to the signal processor 208 when the haptic output amplifier 214 outputs the haptic output drive signal to the haptic output transducer 204. By comparing the time at which it receives these two signals, the signal processor 208 can estimate the duration of a time delay between the signals output by the audio output transducer 202 and the haptic output transducer 204 and can compensate for any such time delay by increasing or decreasing the delay 226 applied to the audio stream as appropriate.

For example, if the audio output amplifier 212 outputs the audio output drive signal for a particular audio effect before the haptic output amplifier 214 outputs the corresponding haptic output drive signal for that audio effect, the delay 226 applied to the audio stream by the signal processor 208 may be increased by an amount equal to the delay between the output of the audio output drive signal and the output of the haptic output signal by the haptic output drive signal. Conversely, if the haptic output amplifier 214 outputs the haptic output drive signal for a particular audio effect before the audio output amplifier 212 outputs the corresponding audio output drive signal for that audio effect, the time delay 226 applied to the audio stream by the signal processor 208 may be reduced by an amount equal to the time delay between output of the haptic output drive signal and output of the audio output drive signal.

Additionally or alternatively, the signal processor 208 may perform more active monitoring of operational parameters of the audio output amplifier 212, haptic output amplifier 214, audio output transducer 202 or haptic output transducer.

For example, the signal processor may monitor a voltage or current level associated with either or both of the audio output amplifier 212 and haptic output amplifier 214 and use the monitored voltage or current levels to estimate a time delay between the output of the audio signal by the audio output transducer 202 and output of the haptic signal by the haptic output transducer 204 and take appropriate action to minimise this delay, by adjusting the time delay 226 applied to the audio stream as necessary.

In the system 200 discussed above the signal processor 208 analyses the audio stream received from the processor 206 and generates a haptic output signal corresponding to a particular audio effect that is present in the received audio stream. In an alternative arrangement, a haptic output signal is provided to the signal processor (e.g. by the processor) and the signal processor is operative to synchronise output of the haptic output signal by the haptic output transducer with and output of the corresponding audio effect by the audio output transducer, as will now be discussed with reference to FIGS. 4 and 5.

Figure 4:
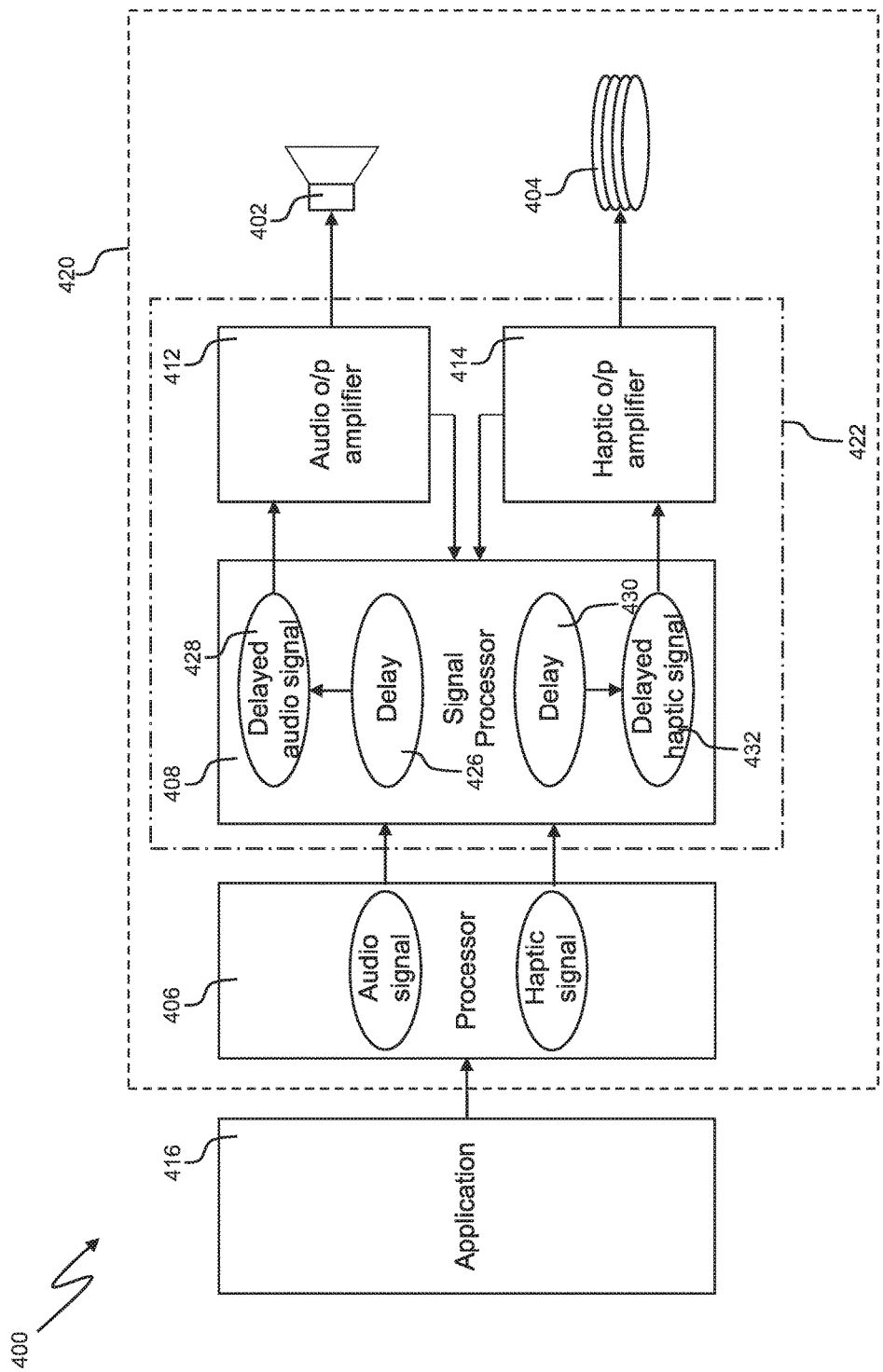
FIG. 4 is a schematic diagram showing part of an alternative system for providing substantially synchronised audio and haptic outputs.

FIG. 4 is a schematic diagram showing part of a system for providing substantially synchronised audio and haptic outputs.

The system, shown generally at 400 in FIG. 4, is similar to the system 200 of FIG. 2, and includes an audio output transducer 402 for providing an audio output and a haptic output transducer 404 for providing a haptic output.

The system 400 further includes a processor 406, which may be, for example, an application processor. The processor 406 interfaces with a signal processor 408, which may be, for example, a digital signal processor (DSP).

The signal processor 408 interfaces with an audio output amplifier 412, which is configured to output an audio output drive signal to drive the audio output transducer 402. Additionally, the signal processor 408 interfaces and with a haptic output amplifier 414, which is configured to output a haptic output drive signal to drive the haptic output transducer 404.

The audio output transducer 402, haptic output transducer 404, processor 406, signal processor 408, audio output amplifier 412 and haptic output amplifier 414 may be parts of a device (represented in FIG. 4 by the dashed box 420) such as a mobile telephone, tablet or laptop computer, smart watch, VR or AR device or the like on which a software application 416 such as a game can be executed. Further, the signal processor 408, audio output amplifier 412 and haptic output amplifier 414 may be packaged on a single integrated circuit, as indicated by the chain dashed box 422 in FIG. 4.

The processor 406 runs an operating environment of the system 400 to allow the software application 416 to be executed by the system 400. During execution, the software application 416 causes audio effects to be output by the audio output transducer 402. For example, in the case of the driving game application referred to above, audio effects such as an engine revving effect, a tyre screech effect and a gunshot effect may be output by the audio output transducer during execution.

In order to output such audio effects, the application 416 generates an audio stream, which is a signal representing audio to be output by the output audio transducer 402. The audio to be output may comprise a stream of audio effects of the kind discussed above, or may comprise additional audio, such as a background musical track in addition to the audio effects.

During execution, the software application 416 also causes haptic outputs to be output by the haptic output transducer 404. These haptic outputs may correspond to particular audio effects that are present in the audio stream generated by the application 416.

In order to output such haptic outputs, the application 416 generates a haptic stream, which is a signal representing haptic signals to be output by the haptic output transducer 404.

As will be appreciated, the audio stream and the haptic stream may not be synchronised when they reach the signal processor 408, as a result of delays introduced by the application 416, processor 406 or transmission from the processor 406 to the signal processor 408, and so if the two streams were simply transmitted to the audio output amplifier 412 and the haptic output amplifier 414 for immediate output, the result could be a noticeable time delay between output by the audio output transducer 402 of an audio effect and output by the haptic output transducer 404 of the corresponding haptic output.

To mitigate this, the signal processor 408 is configured to receive the audio stream and the haptic stream and to apply a delay to one or both of the streams before outputting appropriate output audio and haptic signals to the audio output amplifier 412 and the haptic output amplifier 414, thereby to cause the audio and haptic output signals to be output by the audio output transducer 402 and the haptic output transducer 404 in a substantially synchronised manner.

To this end, the received audio stream and the received haptic stream are output by the processor 406 to inputs of the signal processor 408. The signal processor 408 processes the received audio stream and the received haptic stream to generate appropriate audio and haptic output signals, as will now be described with reference to the flow chart of FIG. 5.

At step 502, the signal processor 408 receives, from the processor 406, the audio signal and the haptic signal, and at step 504 the signal processor 408 processes the received audio signal and the received haptic signal in order to detect a time delay between the audio signal and the haptic signal.

It will be appreciated that if the audio signal is received before the haptic signal there will be a positive time delay between the audio signal and the haptic signal, whereas if the haptic signal is received before the audio signal, there will be a positive time delay between the haptic signal and the audio signal. Thus, the expression "time delay" as used herein is to be interpreted as meaning the time delay between the signal processor 408 receiving one of the audio signal and the haptic signal and the signal processor 408 receiving the other of the haptic signal and the audio signal.

The signal processor 408 may analyse the received audio stream using one or more of the techniques described above to identify the presence of particular audio effects in the received audio stream. The signal processor 408 may also analyse the received haptic stream using one or more of the techniques described above to identify the presence of particular haptic effects in the received haptic stream. The signal processor 408 may then perform a mapping operation to map an identified audio effect in the received audio stream to an identified haptic effect in the received haptic stream. This mapping may be based, for example, on the times at which the particular audio effect and the particular haptic effect are detected in the audio stream and the haptic stream respectively. In a simple example, if a haptic effect is detected in the haptic stream within a predetermined period of time after an audio effect is detected in the audio stream, then the detected haptic effect is mapped to the detected audio effect.

Following this mapping operation, the signal processor 408 can estimate a time delay between the audio signal and the haptic signal, using the difference between the time at which a particular audio effect is detected in the audio stream and the time at which the corresponding haptic effect is detected in the haptic stream.

Alternatively, the signal processor 408 may estimate the time delay between the audio signal and the haptic signal using the difference between the time at which the audio signal was received by the signal processor 408 and the time at which the haptic signal was received by the signal processor 408.

In either case, once the time delay between the audio signal and the haptic signal has been estimated, the signal processor can calculate, at step 506, a delay to be applied to either the audio signal or the haptic signal to compensate for the time delay between the audio signal and the haptic signal. If the haptic signal is delayed with respect to the audio signal, the signal processor 408 will calculate a delay 426 to be applied to the audio signal. In contrast, if the audio signal is delayed with respect to the haptic signal, the signal processor 408 will calculate a delay 430 to be applied to the haptic signal.

At step 508 the signal processor applies the calculated delay to the audio signal or to the haptic signal as appropriate to generate a delayed audio signal or a delayed haptic signal, and at step 510 the signal processor 408 outputs appropriate signals to the audio output amplifier 412 and to the haptic output amplifier 414.

Thus, if the haptic signal is delayed with respect to the audio signal, the signal processor 408 applies a delay 426 to the audio signal and outputs the delayed audio signal 428 to the audio output amplifier 412, which outputs an audio output drive signal to the audio output transducer 402. At the same time, the signal processor 408 outputs the haptic signal to the haptic output amplifier 414 without applying any delay to the haptic output signal, and the haptic output amplifier 414 outputs a haptic output drive signal to the haptic output transducer 404.

Conversely, if the audio signal is delayed with respect to the haptic signal, the signal processor 408 applies a delay 430 to the haptic signal and outputs the delayed haptic signal 432 to the haptic output amplifier 414, which outputs a haptic output drive signal to the haptic output transducer 404. At the same time, the signal processor 408 outputs the audio signal to the audio output amplifier 412 without applying any delay to the audio output signal, and the audio output amplifier 412 outputs an audio output drive signal to the audio output transducer 402.

In this way the outputs of the audio output amplifier 412 and the haptic output amplifier 414 are substantially synchronised, and the signals output by the audio output transducer 402 and the haptic output transducer 404 are also substantially synchronised, such that there is substantially no time delay between the user of the system 400 hearing the audio effect output by the audio output transducer 402 and feeling a haptic output of the system 400 output by the haptic output transducer 404.

As in the system 200 described above with reference to FIG. 2, feedback signals from the audio output amplifier 412 and the haptic output amplifier 414 can be input to the signal processor 408 to improve further the synchronisation between the audio signal output by the audio output transducer 402 and the haptic output transducer 404 or to compensate for degradation in synchronisation performance arising from, for example, drift in the audio output amplifier 412, haptic output amplifier 414, audio output transducer 402 or haptic output transducer 404, temperature-based variations in the performance of the audio output amplifier 412, haptic output amplifier 414, audio output transducer 402 or haptic output transducer 404, or delays introduced by systems such as a speaker protection system or a haptics protection system that may be provided in the system 400 downstream of the signal processor 408.

As will be appreciated, the systems and methods disclosed herein provide mechanisms for providing substantially synchronised audio and haptic outputs using real-time analysis of an input audio stream. This mechanism can be used to provide increased sensory information to a user of an application executing on a system without the need to provide for haptic outputs in the application at the design and programming stage. This simplifies and accelerates the application design and implementation process, and provides a richer and more immersive user experience than is possible in applications that were not initially designed to provide haptic outputs.

In addition, the synchronisation of audio and haptic outputs can also be used to provide an improved bass response in the system 200, 400. For example, a speaker protection system that may be provided in the system 200, 400 to prevent damage to the output audio output transducer 202, 402 arising from over excursion may reduce the bass output of the audio output amplifier 212, 412. To compensate for the reduced bass output of the audio output transducer 202, 204, an appropriate haptic output signal can be generated by the signal processor 208, 408 and input to the haptic output amplifier 214, 414 at the same time as the corresponding audio output signal is input to the audio output amplifier 212, 412. In this way, a haptic output signal compensating for the reduced bass output of the audio output transducer 202, 402 can be output by the haptic output transducer 204, 404 substantially synchronously with the audio output signal output by the audio output transducer 202, 402.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A system for providing audio and haptic outputs, the system comprising:
  an audio output amplifier for driving an audio output transducer;
  a haptic output amplifier for driving a haptic output transducer; and
  a signal processor,
  wherein the signal processor is configured to:
    receive an audio signal representing audio to be output by the audio output transducer;
    receive a haptic signal representing a haptic output to be output by the haptic output transducer;
    apply a delay to the received audio signal to generate a delayed audio signal or apply a delay to the received haptic signal to generate a delayed haptic signal;
    output the delayed audio signal to the audio amplifier and output the haptic signal to the haptic output amplifier, or output the delayed haptic signal to the haptic output amplifier and output the audio signal to the audio output amplifier, such that an audio output signal output by the audio output amplifier is substantially synchronised with a haptic output signal output by the haptic output amplifier.

2. A system according to claim 1, wherein the signal processor is configured to:
  detect a characteristic of the received audio signal that indicates that a particular audio effect is represented by the received audio signal;
  upon detecting the characteristic of the received audio signal, generate a haptic signal which corresponds to the particular audio effect;
  apply a delay to the received audio signal to generate a delayed audio signal;
  output the delayed audio signal to the audio amplifier and output the haptic signal to the haptic output amplifier, such that an audio output signal representing the particular audio effect output by the audio output amplifier is substantially synchronised with a haptic output signal corresponding to the particular audio effect output by the haptic output amplifier.

3. A system according to claim 2 wherein the signal processor is configured to detect a characteristic comprising an envelope of the received audio signal, which envelope corresponds to an envelope of the particular audio effect.

4. A system according to claim 3 wherein the signal processor is configured to analyse one or more characteristics of the envelope of the received audio signal, wherein the one or more characteristics comprise:
  signal strength;
  attack time;
  decay time;
  speed of attack; and
  speed of decay.

5. A system according to claim 2 wherein the signal processor is configured to detect a characteristic comprising a frequency signature present in the received audio signal, which frequency signature corresponds to a frequency signature of the particular audio effect.

6. A system according to claim 2 wherein generating the haptic output signal comprises retrieving a haptic playback waveform corresponding to the particular sound from a memory containing a plurality of haptic playback waveforms.

7. A system according to claim 1 wherein the signal processor is further configured to:
  receive a signal from the audio output amplifier;
  receive a signal from the haptic output amplifier;
  compare the received signals to estimate a time delay between output of an audio output drive signal by the audio output amplifier and output of a haptic output drive signal by the haptic output amplifier; and
  adjust the delay applied to the received audio signal or the delay applied to the received haptic signal to compensate for the time delay so estimated.

8. A system according to claim 1 wherein the signal processor is further configured to:
  monitor a voltage or current level at the audio output amplifier or haptic output amplifier;
  based on the monitored voltage or current levels, estimate a time delay between the output of the audio signal by the audio output transducer and output of the haptic signal by the haptic output transducer; and
  adjust the delay applied to the received audio signal or the delay applied to the received haptic signal to compensate for the time delay so estimated.

9. A system according to claim 1 wherein the signal processor is configured to:
  estimate a time delay between the received audio signal and the received haptic signal based on the difference between a time at which the audio signal was received by the signal processor and a time at which the haptic signal was received by the signal processor; and
  apply a delay based on the estimated time delay to the received audio signal to generate the delayed audio signal or apply a delay based on the estimated time delay to the received haptic signal to generate the delayed haptic signal.

10. A system according to claim 1 wherein the signal processor is configured to:
  analyse the received audio signal to identify the presence of a particular audio effect in the received audio signal;
  analyse the received haptic signal to identify the presence of a particular haptic effect in the received haptic signal;
  estimate a time delay between the received audio signal and the received haptic signal based on the difference between a time at which the identified audio effect was detected in the received audio signal and a time at which the identified haptic effect was detected in the received haptic signal; and
  apply a delay based on the estimated time delay to the received audio signal to generate the delayed audio signal or apply a delay based on the estimated time delay to the received haptic signal to generate the delayed haptic signal.

11. A method for providing a haptic output and an audio output at a device, the method comprising:
  receiving an audio signal representing audio to be output by the device;
  detecting a characteristic of the received audio signal that indicates that a particular audio effect is represented by the received audio signal;
  upon detecting the characteristic of the received audio signal, generating a haptic signal which corresponds to the particular audio effect;
  applying a delay to the received audio signal to generate a delayed audio signal; and
  outputting the delayed audio signal and outputting the generated haptic signal, such that an audio signal representing the particular audio effect output by the device is substantially synchronised with a haptic signal corresponding to the particular audio effect output by the device.

12. A signal processor configured to:
  receive an audio signal representing audio to be output by a device;
  detect a characteristic of the received audio signal that indicates that a particular audio effect is represented by the received audio signal;
  upon detecting the characteristic of the received audio signal, generate a haptic signal which corresponds to the particular audio effect;
  apply a delay to the received audio signal to generate a delayed audio signal;
  output the delayed audio signal and output the haptic signal, such that an audio output signal representing the particular audio effect output by the device is substantially synchronised with a haptic output signal corresponding to the particular audio effect output by the device.

13. A method according to claim 11, wherein generating the haptic signal comprises retrieving, from a memory, a haptic output signal that corresponds to the particular audio effect.

14. A method according to claim 11, wherein generating the haptic signal comprises generating the haptic output signal in real-time using an algorithm that detects characteristics of part or all of the audio signal and, based on the detected characteristics, constructing a corresponding haptic output signal.

15. A signal processor according to claim 12, wherein the signal processor is configured to generate the haptic signal by retrieving, from a memory, a haptic output signal that corresponds to the particular audio effect.

16. A signal processor according to claim 12, wherein the signal processor is configured to generate the haptic signal by generating the haptic output signal in real-time using an algorithm that detects characteristics of part or all of the audio signal and, based on the detected characteristics, constructing a corresponding haptic output signal.

* * * * *